Patented Oct. 22, 1940

2,218,660

UNITED STATES PATENT OFFICE 2,218,660

PROCESS OF PRODUCING PRODUCTS OF HIGH WETTING POWER FROM ALIPHATIC KETONES

Wilfried Schowalter, Ludwigshafen-on-the-Rhine, Hans Haussmann, Mannheim, Max Neber, Ludwigshafen-on-the-Rhine, Helmut Keppler, Leverkusen-Wiesdorf, and Rudolf Schroeter, Leverkusen-Schlebusch, Germany, assignors, by mesne assignments, to General Aniline & Film Corporation, New York, N. Y., a corporation of Delaware No Drawing. Application March 7, 1939, Serial No. 260,328. In Germany March 10, 1938

12 Claims. (Cl. 260—513)

The present invention relates to a process for producing products of high wetting power from aliphatic ketones.

It has already been proposed to sulphonate aliphatic ketones of high molecular weight and thus to prepare wetting, cleansing, dispersing agents or solvents for the treatment of textiles, leather or similar substances.

We have now found that products having a specially high wetting power are obtained by introducing into aliphatic ketones having from 11 to 17 carbon atoms in the molecule, the alkyl groups of which contain at least 5 carbon atoms, at least one of the groups —$SO_3H$ or —S—$SO_3H$. The alkyl radicle may contain a straight or branched carbon chain. The ketones of the said kind may be obtained for example from unitary fatty acids or fatty acid mixtures and may be symmetrical or unsymmetrical.

The mixtures of low molecular carboxylic acids having from 6 to 9 carbon atoms obtainable by the oxidation of paraffin hydrocarbons, as for example hard paraffin wax, soft paraffin wax, paraffin oil, Diesel oil, middle oil or hydrogenation products of coals, tars or oxides of carbon, or mixtures containing mainly carboxylic acids having the said number of carbon atoms, are especially suitable for the preparation of the ketones. Carboxylic acids having from 7 to 9 carbon atoms are especially suitable. The carboxylic acids may also be obtained by oxidation of the high molecular weight branched alcohols formed in the methanol synthesis, for example by heating with caustic alkalies.

The conversion of the carboxylic acids into ketones is effected by known methods, as for example by heating their calcium salts or by heating the free carboxylic acids in the presence of catalysts favoring the splitting off of $CO_2$, as for example iron. When using unitary carboxylic acids, symmetrical ketones are formed; from mixtures of carboxylic acids having different lengths of carbon chain, unsymmetrical ketones are also formed. The ketones may also be prepared in other ways, as for example by condensation of methyl ketones (from the above fatty acids and acetic acid) with aldehydes of the necessary length of chain, as for example butyraldehyde or ethylhexylaldehyde, and if necessary subsequent hydrogenation to form the saturated ketone. Ketone mixtures may also be used which contain a preponderating amount of ketones of the said kind and also ketones of higher or lower molecular size. Ketones suitable in the present process as initial material may be obtained by condensing one molecular proportion of acetone or methyl ethyl ketone with two molecular proportions of an aldehyde of the necessary length of chain, such as butyraldehyde, hexylaldehyde, etc., and then reducing the condensation product.

The introduction of the groups —$SO_3H$ and —S—$SO_3H$ into the said ketones may be effected by methods known per se, advantageously by the action of sulphuric acid monohydrate, chlorsulphonic acid or oleum. Solvents or diluents may be employed, as for example carbon tetrachloride, trichlorethylene, tetrachlorethane, chloroform or ether. The sulphonation may also be carried out in the presence of substances binding water, as for example acid chlorides or anhydrides, such as acetyl chloride, acetic anhydride or phosphorus pentoxide. Ketones which contain halogen atoms or a double linkage conjugated to the CO-group may also be reacted with salts of sulphurous acid, as for example alkali sulphites, and the former also with alkali thiosulphates.

In the said manner products are obtained which contain sulphonic groups either attached directly to carbon or attached to carbon by way of a sulphur atom.

The working up of the reaction products is effected in known manner by neutralization with alkalies, ammonia or amines. The salts thus obtainable are readily soluble in water. The aqueous solutions have an excellent wetting power for substances of the most varied kinds, as for example textiles, leather, paper, dyestuffs or pigments, in particular even at ordinary temperature. They may be used alone or together with other textile assistants, as for example soaps, soap-like substances, solvents, inorganic or organic salts or bleaching earths.

The following examples will further illustrate how the present invention can be carried out in practice, but the invention is not restricted to these examples. The parts are by weight.

Example 1

52 parts of chlorsulphonic acid are added at from 20° to 25° C. to 48 parts of a mixture of aliphatic carboxylic acids having a carbon atom number of from 7 to 9 obtained from an oxidation product of hard paraffin wax (boiling range from 60° to 90° C. under a pressure of 0.2 millimeter (mercury gauge)) and stirred until a water-soluble product has been formed. The sulphonation product is neutralized with caustic soda solution, the aqueous solution freed from small amounts of unsulphonated constituents and evaporated. The resulting product has an excellent wetting power.

A similar product is obtained from a ketone mixture prepared by ketonization of a mixture of aliphatic carboxylic acids having from 6 to 7 carbon atoms and a content of acids having 5 carbon atoms, obtained from an oxidation product of hard paraffin wax.

*Example 2*

200 parts of a ketone mixture (obtained from the first runnings fatty acids having 6 to 11 carbon atoms, in which the carboxylic acids having from 6 to 9 carbon atoms preponderate—boiling range 205° to 250° C. at atmospheric pressure—obtainable in the oxidation of paraffin wax by heating in the presence of iron powder) are mixed with 100 parts of acetic anhydride. Into this mixture there are allowed to flow at from 10° to 15° C. 100 parts of sulphuric acid monohydrate while stirring. The sulphonation mixture is stirred for a long time at ordinary temperature until the product is soluble in water, then poured onto ice and neutralized with caustic soda solution. After adding 100 parts of butanol, the mixture separates into two layers the upper of which contains the sulphonation product. This may be used, as such or after separation of the butanol by distillation, as a wetting and emulsifying agent or as a fat-splitting agent.

*Example 3*

Carboxylic acids having a mean molecular weight of 153 (obtained by oxidation of the high molecular weight alcohols obtained as a by-product in the synthesis of methanol) are ketonized by heating their calcium salts. 25 parts of the resulting ketone mixture are dissolved in 10 parts of carbon tetrachloride and 26 parts of chlorsulphonic acid are added to the solution at from 20° to 25° C. while stirring. After further stirring for about 3 hours, the sulphonation mixture is neutralized with caustic soda solution, freed from unsulphonated constituents and evaporated to dryness. The sulphonation product is readily soluble in water and has a high wetting and foaming power.

*Example 4*

240 parts of diheptyl ketone (obtained from a fatty acid fraction containing mainly fatty acids having 8 carbon atoms by ketonization) are dissolved in 1500 parts of carbon tetrachloride and then about 75 parts of gaseous chlorine are led in at from 20° to 25° C. After the evolution of hydrogen chloride is ended, the carbon tetrachloride is evaporated off in vacuo and the resulting chlorination mixture heated to boiling under reflux for from 8 to 10 hours with a mixture of 2500 parts of water, 1500 parts of alcohol and 300 parts of sodium thiosulphate or sodium sulphite while stirring. After evaporating off the alcohol, the reaction product is separated from salt solution by the addition of butanol; it may be used as such or after the removal of unconverted constituents as a wetting agent.

What we claim is:

1. The process of producing products of high wetting power from aliphatic ketones, which comprises introducing at least one of the groups selected from the class consisting of —SO₃H and —S—SO₃H groups into an aliphatic ketone having from 11 to 17 carbon atoms in the molecule, the alkyl groups of which contain at least 5 carbon atoms.

2. The process of producing products of high wetting power from aliphatic ketones, which comprises introducing at least one of the groups selected from the class consisting of —SO₃H and —S—SO₃H groups into ketones contained in a mixture of aliphatic ketones having from 11 to 17 carbon atoms in the molecule, the alkyl groups of which contain at least 5 carbon atoms.

3. The process of producing products of high wetting power from aliphatic ketones, which comprises introducing at least one of the groups selected from the class consisting of —SO₃H and —S—SO₃H groups into ketones contained in a mixture of aliphatic ketones having from 11 to 17 carbon atoms in the molecule, the alkyl groups of which contain at least 5 carbon atoms obtainable by ketonizing aliphatic carboxylic acids having from 6 to 9 carbon atoms.

4. The process of producing products of high wetting power from aliphatic ketones, which comprises introducing at least one of the groups selected from the class consisting of —SO₃H and —S—SO₃H groups into ketones contained in a mixture of aliphatic ketones having from 11 to 17 carbon atoms in the molecule, the alkyl groups of which contain at least 5 carbon atoms obtainable by ketonizing aliphatic carboxylic acids having from 6 to 9 carbon atoms produced by oxidizing higher molecular aliphatic hydrocarbons.

5. The process of producing products of high wetting power from aliphatic ketones, which comprises introducing at least one of the groups selected from the class consisting of —SO₃H and —S—SO₃H groups into an unsymmetrical aliphatic ketone having from 11 to 17 carbon atoms in the molecule, the alkyl groups of which contain at least 5 carbon atoms.

6. The process of producing products of high wetting power from aliphatic ketones, which comprises introducing at least one of the groups selected from the class consisting of —SO₃H and —S—SO₃H groups into diheptyl ketone.

7. An aliphatic ketone having from 11 to 17 carbon atoms in the molecule, each alkyl group of which contains at least 5 carbon atoms, which ketone contains at least one of the groups selected from the class consisting of —SO₃H and —S—SO₃H groups.

8. An unsymmetrical aliphatic ketone having from 11 to 17 carbon atoms in the molecule, each alkyl group of which contains at least 5 carbon atoms, which ketone contains at least one of the groups selected from the class consisting of —SO₃H and —S—SO₃H groups.

9. A mixture of aliphatic ketones having from 11 to 17 carbon atoms in the molecule, each alkyl group of which contains at least 5 carbon atoms which ketones contain at least one of the groups selected from the class consisting of —SO₃H and —S—SO₃H groups.

10. A mixture of aliphatic ketones having from 11 to 17 carbon atoms in the molecule, each alkyl group of which contains at least 5 carbon atoms, obtainable by ketonizing aliphatic carboxylic acids having from 6 to 9 carbon atoms in the molecule.

11. A mixture of aliphatic ketones having from 11 to 17 carbon atoms in the molecule, each alkyl group of which contains at least 5 carbon atoms, obtainable by ketonizing aliphatic carboxylic acids having from 6 to 9 carbon atoms in the molecule obtained by oxidizing high-molecular aliphatic hydrocarbons which ketones contain at least one of the groups selected from the class consisting of —$SO_3H$ and —S—$SO_3H$ groups.

12. Diheptyl ketone containing at least one —$SO_3H$ group attached to a carbon atom.

WILFRIED SCHOWALTER.
HANS HAUSSMANN.
MAX NEBER.
HELMUT KEPPLER.
RUDOLF SCHROETER.